United States Patent [19]

Handa et al.

[11] Patent Number: 4,613,126
[45] Date of Patent: Sep. 23, 1986

[54] CHAIN DRIVE TYPE CARRIAGE RECIPROCATING DEVICE FOR A COPYING MACHINE

[75] Inventors: Tamami Handa, Nara; Eiichi Shimizu, Yamatokoriyama, both of Japan

[73] Assignee: Sharp Kabushiki Kaisha, Osaka, Japan

[21] Appl. No.: 684,343

[22] Filed: Dec. 20, 1984

[30] Foreign Application Priority Data

Dec. 27, 1983 [JP] Japan .............................. 58-249974

[51] Int. Cl.$^4$ ............................................. B65H 5/04
[52] U.S. Cl. .................................... 271/267; 198/750
[58] Field of Search ....................... 271/267, 268, 269; 198/750

[56] References Cited

U.S. PATENT DOCUMENTS 1,618,632  2/1927  Belluche ..................... 271/268 X
4,429,866  2/1984  Castro-Hahn ............... 271/267 X

*Primary Examiner*—Richard A. Schacher
*Attorney, Agent, or Firm*—Birch, Stewart, Kolasch & Birch

[57] ABSTRACT

A document table reciprocating device for a copying machine comprising a pair of sprockets which are disposed near to end of the path of a document table, a chain engaged around the pair of sprockets, a roller engaged with the chain, and a plate having an opening in such a shape for enabling the roller to stay in the opening when the roller is positioned adjacent a turning point around the sprocket.

4 Claims, 9 Drawing Figures

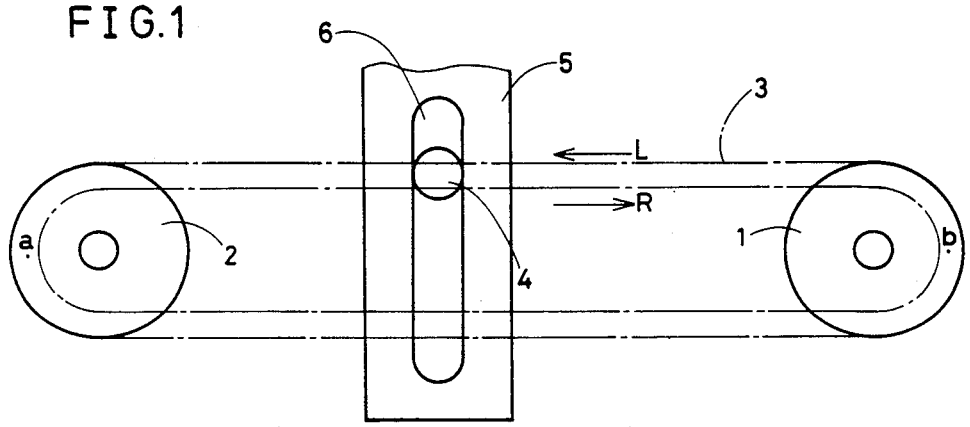
FIG.1
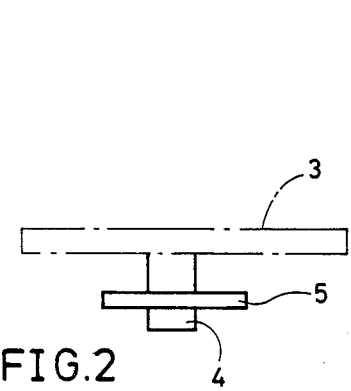
FIG.2
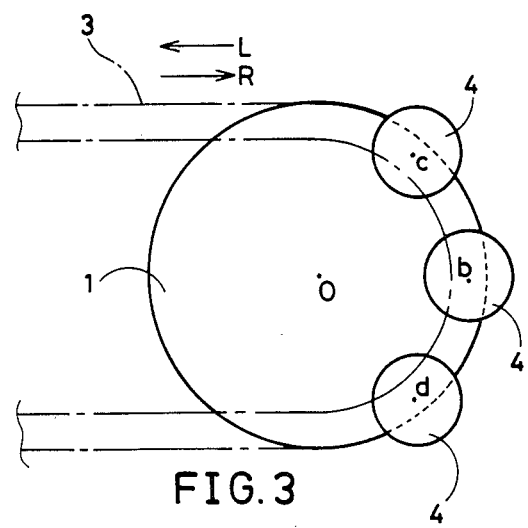
FIG.3
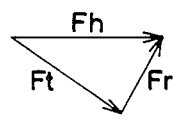
FIG.4(A)
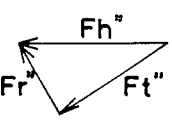
FIG.4(B)
FIG.4(C)

4,613,126

CHAIN DRIVE TYPE CARRIAGE RECIPROCATING DEVICE FOR A COPYING MACHINE

BACKGROUND OF THE INVENTION

The present invention relates to a carriage moving device and, more particularly, to a chain drive type carriage reciprocating device which reciprocates a carriage such as a document table of a copying machine carrying a copy document.

One type of electrophotographic copying machine is operated in a manner that a document table carrying an original document reciprocates so as to expose an image of the original document on a photoreceptor through an optical system.

A document table reciprocating device of the chain delivery type as shown in FIG. 1 has been proposed for use in the above copying machine. For example, the above document table reciprocating device is disclosed in U.S. Pat. No. 4,332,458, issued on June 1, 1982, by Lionel B. Hoffman, entitled "TABLE TOP COPY MACHINE".

In the type of electrophotographic copying machine in which the document table carrying the original document is reciprocated, as shown in FIG. 1, the document table (not shown) is driven by a motor through a driving chain 3 and sprockets 1 and 2.

The driving chain 3 is coupled around the sprockets 1 and 2 which are disposed near to each end of the path of the document table. A drive pin (or roller) 4 is coupled to the driving chain 3. A plate 5 is secured at a desired position to the bottom of the document table and has a hole 6. The hole 6 is in a rectangular shape having semicircular ends. The drive pin 4 is inserted within the hole 6 of the plate 5 as shown in FIG. 2 and vertically movable inside the hole 6. The plate 5 with the pin 4 is moved in the horizontal directions of the sprockets 1 and 2 along the driving chain 3. One of the sprockets 1 and 2 is coaxially mounted on the drive shaft of a motor. As the motor turns, the driving chain 3 is driven around the sprockets 1 and 2. The drive pin 4 pulls the plate 5 connected to the document table along the driving chain 3. As the drive pin 4 travels around either sprockets 1 or 2, the document table movement is reversed to achieve a continuous reciprocating motion. Thus, the document table can perform the reciprocating movements.

The turning points of the drive pin 4 are denoted by points a and b on the sprockets 1 and 2 as shown in FIG. 1.

As described above, while the copying operation of the copying machine is carried out, the driving chain 3 is driven in the arrow direction "L" by the motor so as to perform the reciprocating movement of the document table.

On the other hand, when the copying operation is not carried out and the driving chain 3 is not driven by the motor, the document table can be manually moved. However, even when the document table is manually moved and the drive pin 4 with the plate 5 connected to the document table is reached at the turning point a or b of the sprockets 1 and 2, the drive pin 4 is locked so that the drive pin 4 is stopped moving at the turning points a or b. After the drive pin 4 is locked at the turning point a or b, the document table cannot be manually moved.

The above problem will be described with reference to FIGS. 3 and 4 when the drive pin 4 is stopped moving at the turning point b.

It is assumed that the drive pin 4 is set at the upper line of the driving chain 3 as shown in FIG. 1 and the document table is manually moved in the direction of the sprocket 1 (in the arrow direction "R") without driving the driving chain 3 by the motor.

When the drive pin 4 arrives at the point c short of the turning point b according to the movement of the plate 5, as shown in FIG. 4(A), a force Fh in a horizontal direction from the plate 5 at the point c is divided into a force component Ft in a tangential direction of the sprocket and force component Fr in a radius direction of the sprocket, so that the drive pin 4 is rotated and moved by means of a moment produced by the force component Ft. Accordingly, the drive pin 4 reaches the turning point b passing through the point c.

On the other hand, it is assumed that the drive pin 4 is set at the lower line of the driving chain 3 and the document table is manually moved in the direction the sprocket 1 (or in the arrow direction "R").

When the drive pin 4 arrives at the point d short of the turning point b according to the movement of the plate 5, as shown in FIG. 4(C), a force F"h in the horizontal direction from the plate 5 at the point d is divided into a force component F"t is the tangetial direction of the sprocket and the other force component F"r in the radius direction of the sprocket, so that the drive pin 4 is rotated and moved by means of a moment produced by the force component F"t. Accordingly, the drive pin 4 reaches the turning point b passing through the point d.

However, a force F'h in the horizontal direction from the plate 5 is only applied to the drive pin 4 which is reached at the turning point b passing through the point c or d as shown in FIG. 4(B). Because the force component F't in the tangential direction of the sprocket against the force F"h becomes zero, the moment is not produced by the force component F't in the tangential direction of the sprocket and the drive pin 4 cannot be rotated and moved. Therefore, the drive pin 4 is stopped from moving at the turning point b on the sprocket 1 and locked.

The above problem also occurs at the turning point a of the sprocket 2.

When the drive pin 4 is locked so that the drive pin 4 is stopped from moving at the turning point a or b, the document table cannot be moved from the position where the drive pin 4 is locked. In the copying machine having the above document table reciprocating device, a lock releasing device must be additionally provided with the document table reciprocating device for releasing the locking of the drive pin 4, and can be manually operated.

SUMMARY OF THE INVENTION

Accordingly, it is an object of the present invention to provide an improved chain drive type carriage moving device which eliminates the above problems, and which smoothly reciprocates a carriage such as a document table of a copying machine carrying an original document.

It is another object of the present invention to provide an improved chain drive type carriage reciprocating device which ensures a suitable reciprocating motion of a document table for a copying operation of a copying machine.

It is further object of the present invention to provide an improved carriage reciprocating device which prevents a carriage such as a document table of a copying machine from being locked even when the document table is manually moved in the reciprocating directions.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

To achieve the above objects, according to an embodiment of the present invention, a document table reciprocating device for a copying machine comprises a pair of sprockets which are disposed near to the end of the path of a document table, a is chain engaged around the pair of sprockets, a roller means is engaged with the chain, and a plate means is provided with an opening having a shape which enables the roller means to stay in the opening when the roller means is positioned adjacent a turning point around the sprocket.

The opening is shaped to have a pair of openings with at least two rounded corners and a bridging slot or hole for connecting the pair of openings, the width of the pair of openings being larger than that of the bridging hole. The radius of curvature of the rounded corners are substantially equal to the diameter of the roller means.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 1 shows a side view of a conventional chain driving system of a chain driving type document table reciprocating device of a copying machine;

FIG. 2 shows a plan view for explaining the relationship between the drive pin and the plate in the system of FIG. 1;

FIG. 3 shows a side view of a sprocket portion in the chain drive type carriage reciprocating device of FIG. 1 for explaining the locking of the drive pin when a document table is manually moved without driving a driving chain by a motor;

FIGS. 4(A), 4(B), and 4(C) show vector diagrams of the forces being applied to a drive pin at points b, c, and d of a sprocket, respectively;

DETAILED DESCRIPTION OF THE INVENTION

Figure 5:
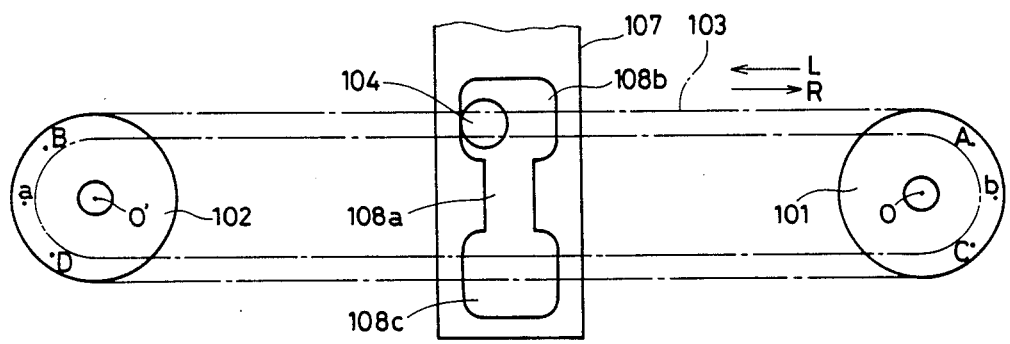
FIG. 5 shows a side view of the chain driving system of a document table reciprocating device according to an embodiment of the present invention.
Figure 6:
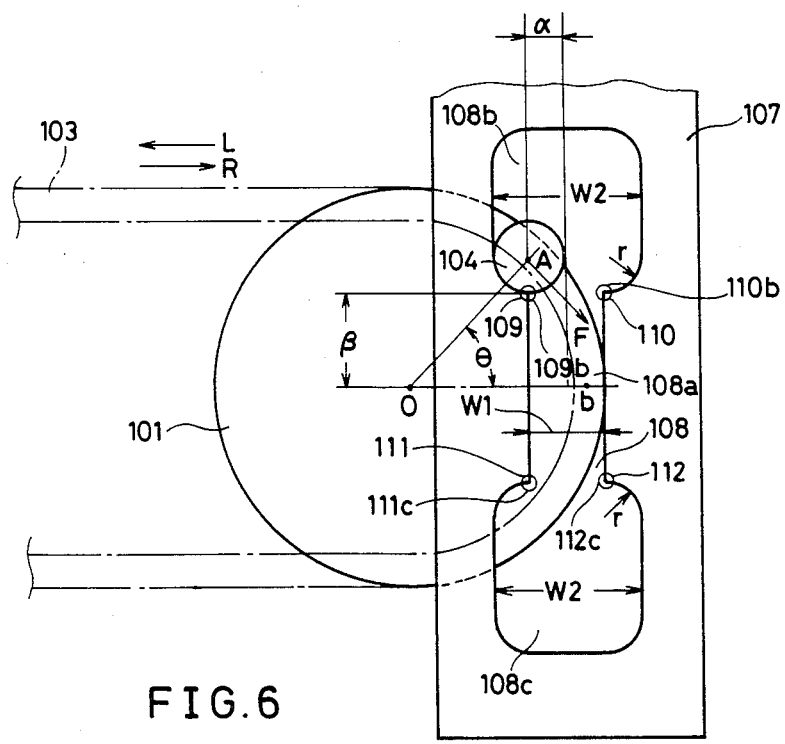
FIG. 6 is a side view showing a stop condition of a drive roller on a sprocket.
Figure 7:
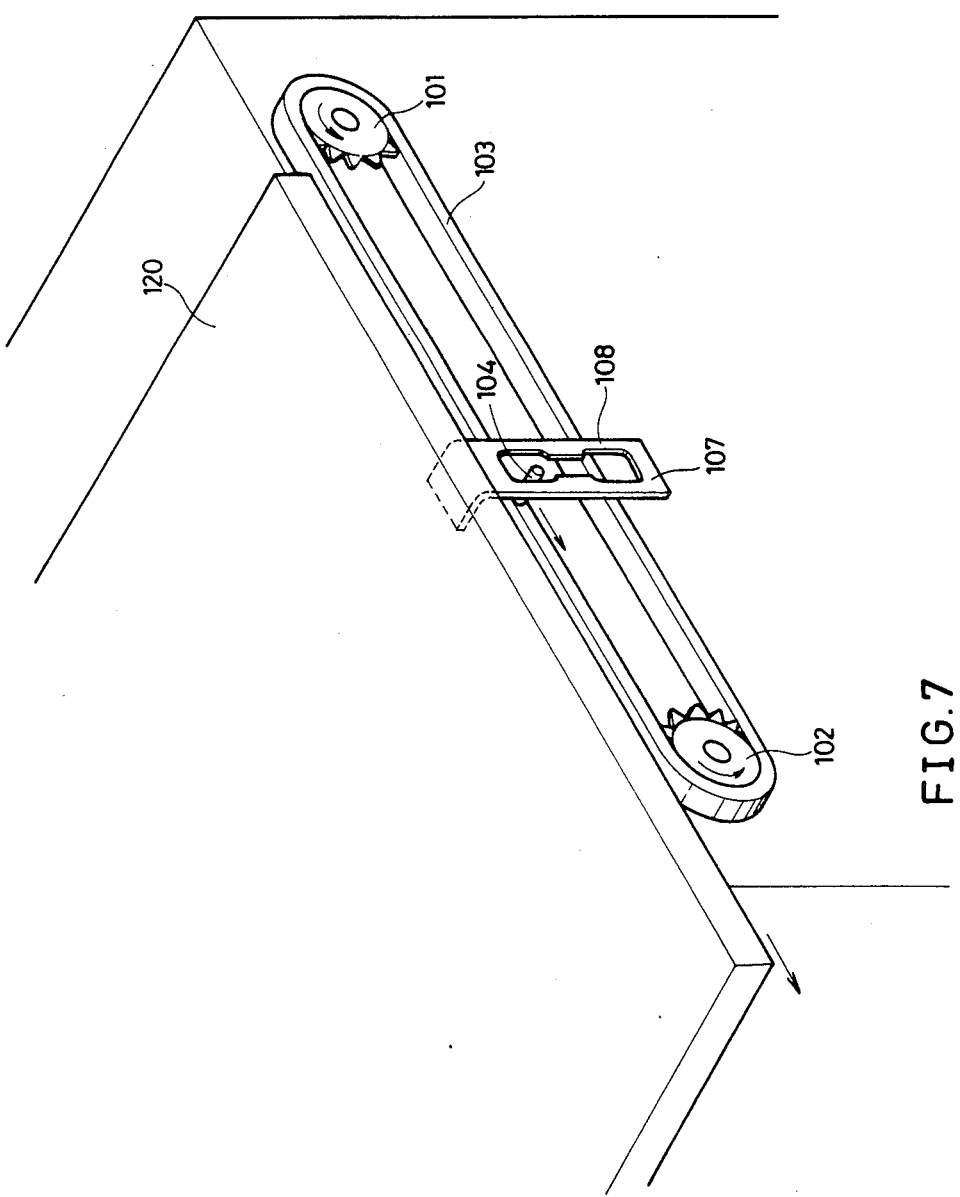
FIG. 7 shows a side view of a copy machine when a document table is connected to the document reciprocating device of FIG. 5.

FIG. 5 shows a side view of a chain driving system of a document table reciprocating device according to an embodiment of the present invention. FIG. 6 is a side view showing a stop condition of a roller on a sprocket. FIG. 7 shows a side view of a copying machine when the document table is connected to a document table reciprocating device of FIG. 5.

A document table reciprocating device according to an embodiment of the present invention comprises sprockets 101 and 102, a driving chain 103, a plate 107 having an "dumb bell" shaped hole 108, a drive roller 104, and a motor (not shown).

The plate 107 is secured at a desired position of a bottom of a document table 120 carrying an original document as shown in FIG. 7. The driving chain 103 is coupled or engaged around the sprockets 101 and 102 which are disposed near to the end of the path of the document table 120. The drive roller 104 is rotatably coupled to or engaged with the driving chain 103.

The drive roller 104 is inserted with the "dumb bell" shaped hole 108 of the plate 107 and vertically movable inside the hole 108. One of the sprockets 101 and 102 is coaxially mounted on the drive shaft of a motor. As the motor turns, the driving chain 103 is driven around the sprockets 101 and 102. The drive roller 104 pulls the plate 107 connected to the document table 120 along the driving chain 103. As the drive roller 104 travels around either sprocket 101 or 102, the movement of document table 120 is reversed to achieve a continuous reciprocating motion. Thus, the document table 120 performs the reciprocating movements.

The feature of the present invention is that the "dumb bell" shaped hole 108 is provided with the plate 107. Therefore, the plan view of the "dumb bell" shaped hole 108 will be described with reference to FIG. 6.

The "dumb bell" shaped hole 108 of the plate 107 comprises two "round edged-rectangular" openings 108b and 108c, and a bridging hole 108a.

The bridging hole 108a has a width W1 more than or substantially equal to the diameter of the drive roller 104 so that the drive roller 104 can vertically travel within the bridging hole 108a.

Each of the openings 108b and 108c has a width W2 more than the width W1 of the bridging hole (W2>W1). The openings 108b and 108c are positioned at the ends of the bridging hole 108 in the longitudinal direction, respectively, and are symmetrically formed in connection with the bridging hole 108a. Each opening 108b and 108c has two rounded corners whose radius of curvature is substantially the diameter "r" of the drive roller 104 in such a manner that the center of curvature of a rounded corner 109 in the opening 108b and a center of curvature of a rounded corner 111 in the opening 108c are in line with one side of the bridging hole 108a, and the center of curvature of a rounded corner 110 of the opening 108b and the center of curvature of a rounded corner 112 in the opening 108c are in line with the other side of the bridging hole 108a. That is, the width W2 is about forth times the radius "r" of the drive roller 104. The surfaces of the rounded corners 111 and 112 of the opening 108c and the rounded corners 109 and 110 of the opening 108b are formed in a shape having a radius "r" of the drive roller 104 so that the circumference of the drive roller 104 is in contact with the surface of each of the rounded corners 109, 110, 111, and 112. The other corners of the openings 108b and 108c except the rounded corners 109, 110, 111, and 112 may be formed in the same rounded shape as the rounded corners 109 to 112 although it is not necessary to do so. At least, all corners of the openings 108b and 108c may be formed so that the driving roller 104 is moved exactly along the surface of the each of the rounded corners 109 to 112.

The plate 107 having the "dumb bell" shaped hole 108 is connected at a desired position to the bottom of the document table 120 as shown in FIG. 7. The roller 104 connected to the driving chain 103 is inserted within the hole 108 of the plate 107 and is vertically movable inside the hole 108.

As shown in FIG. 5, when the drive roller 104 is set at the upper line of the driving chain 103 and inserted within the opening 108b, the plate 7 with the drive roller 104 is moved in the arrow direction "L" by driving the drive chain 103 in the arrow direction "L" by the motor so as to perform the copying operation of the copying machine. At the same time, the document table 120 is moved in the arrow direction "L".

When the plate 107 approaches to the sprocket 102, the drive roller 104 is rotated and moved exactly along the surface of the rounded corner 109 of the opening 108b, and then reaches the round corner 112 of the opening 108c through the bridging hole 108a, so that the drive roller 104 passes the turning point a of the sprocket 102.

After the drive roller 104 passes the turning point a of the sprocket 102, the plate 107 with the drive roller 104 is moved in the direction of the sprocket 101, so that the document table 120 is reversed in its direction to achieve a turning motion.

Further, when the drive roller 104 approaches to the sprocket 101, the drive roller 104 is rotated and moved exactly along the surface of the rounded corner 112 of the opening 108c, and then reaches the rounded corner 109 of the opening 108b through the bridging hole 108a, so that the drive roller 104 passes on the turning point b of the sprocket 101.

When passing the drive roller 104 on the point b of the sprocket 101, the plate 107 with the drive roller 104 is moved in the direction of the sprocket 102, so that the document table 120 is moved in the direction of the sprocket 102.

As described above, the document table 120 connected to the plate 107 is reciprocated along the driving chain 103 by circulating the roller 104 pulling the plate 107 between the sprockets 101 and 102 with the driving chain 103 which is driven by the motor.

The prevention of the locking of the roller 104 in the above document table reciprocating device will be described with reference to FIG. 6.

In the case where the drive roller 104 is set at the upper line of the driving chain 103 and the driving chain 103 is not driven by the motor, the drive roller 104 is stopped when moving at point A short of the turning point b of the sprocket 101 when the document table 120 (or the roller 104 with the plate 107) is manually moved in the arrow direction "R".

As shown in FIG. 6, the point A designates a center of curvature of the rounded corner 109, namely, the center of the circle with which the surface of the rounded corner 109 is externally tangent. The line O-b and the line O-A form an angle $\theta$. The point O designates a center of the sprocket 101, and the point b designates the turning point of the sprocket 101.

If the drive roller 104 is forwarded from the point A to the turning point b after the drive roller 104 arrives at the point A, the drive roller 104 should be rotated by the moment produced by the force component F in the tangentail direction of the sprocket 101. However, the center of the roller 104 deviates by the radius "r" of the roller 104 from the center line of the bridging hole 108a in the longitudinal direction. Accordingly, the drive roller 104 comes in contact with the surface of the rounded corner 109 of the opening 108b and is not rotated, so that the drive roller 104 is not moved from point A in the direction of the turning point b.

On the other hand, when the drive roller 104 is set at the upper line of the driving chain 103 and the driving roller 104 with the plate 107 is manually moved in the arrow direction "L", the drive roller 104 contacts the surface of the rounded corner 110 of the opening 108a at the point B of the sprocket 102. Therefore, the drive roller 104 is not rotated and moved toward the turning point a. The point B is on the line which provides the angle $\theta$ with the line O'-a, the line O'-a being formed by the center O' of the sprocket 102 and the turning point a of the drive roller 104 on the sprocket 102. In the same manner as described with the point A of the sprocket 101, the drive roller 104 contacts the surface of the rounded corner 110 and is not rotated and moved in the direction of the turning point a, so that the drive roller 104 stops moving on the point B of the sprocket 102.

When the drive roller 104 is set at the lower line of the driving chain 103 and the drive roller 104 with the plate 107 is manually moved in the arrow direction "L" or "R", in the same manner as explained with points A and B, the drive roller 104 is stopped from moving at the point D or C by means of the rounded corners 111 and 112 of the sprockets 101 and 102. The points A and C are symmetrical with respect to the line O-b, and the point B and D are symmetrical with respect to the line O'-a.

As described above, although the drive roller 104 can be stopped moving on the points A, B, C, and D, the drive roller 104 can be manually moved between the points A and B, or C and D.

Because the plate 107 has the "dumb bell" shaped hole 108, which comprises the openings 108b and 108c having the two rounded corners 109 and 110, or 111 and 112, and the bridging hole 108a, the drive roller 104 is only moved between the points A and B or the points C and D when the document table 120 is manually moved in the horizontal direction.

As the movements of the driving roller 104 can be limited between points A and B, or points C and D when the document table 120 is manually moved, the drive roller 104 is neither reached at the turning points a and b nor is locked. Therefore, the lock releasing device for releasing the locking of the drive roller at the turning point a or b can be eliminated.

As shown in FIG. 6, the distance $\alpha$ from the center line of the bridging hole 108a in the longitudinal direction to the center of the drive roller 104, and the distance $\beta$ from the line O-b to the connecting portion between the opening 108b and the bridging hole 108a may be appropriately selected, so that the angle $\theta$ determining the stop position of the drive roller 104 may be freely selected. Therefore, the stop position of the drive roller 104 on the sprocket is easily and freely determined. In the embodiment of the present invention, the distance is substantially equal to the radius "r" of the roller 104. ($\alpha = r$)

In the present invention, when the document table 120 is manually moved in the horizontal direction without driving the driving chain by the motor, the drive roller is stopped at a position short of the turning point on the sprocket with the help of the rounded corner for engaging with the driving roller, so that the driving roller is not locked at the turning point on the sprocket.

Connecting portions 109b and 110b between the opening 108b and the bridging hole, and connecting portions 111c and 112c between the opening 108c and the bridging hole 108 may be rounded.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A device for reciprocating a document table of a copying machine, comprising:
   a plate means secured to said document table, said plate means having a substantially dumb bell shaped opening comprising two rounded edged rectangular sections joined by a bridging section;
   a pair of sprockets located near the ends of a reciprocal path of said plate;
   a chain engaged for movement around said sprockets; and
   roller means, coupled to said chain and extending through said dumb bell shaped opening of said plate means for utilizing the movement of said chain to reciprocate said plate means whereby upon manual reciprocation of said document table, said roller means becomes engaged with a surface of said rounded edge rectangular sections.

2. The device of claim 1, wherein the width of each rectangular section is more than that of the bridging hole.

3. The device of claim 2, wherein the two rounded edge sections are provided adjacent the bridged hole.

4. The device of claim 1, wherein a radius of curvature of the rounded edge sections is substantially the diameter of the roller means.

* * * * *